Apr. 17, 1923.                                                      1,452,423
                            J. B. HARMON
                            VEHICLE WHEEL
                         Filed Sept. 19, 1921            2 Sheets-Sheet 1
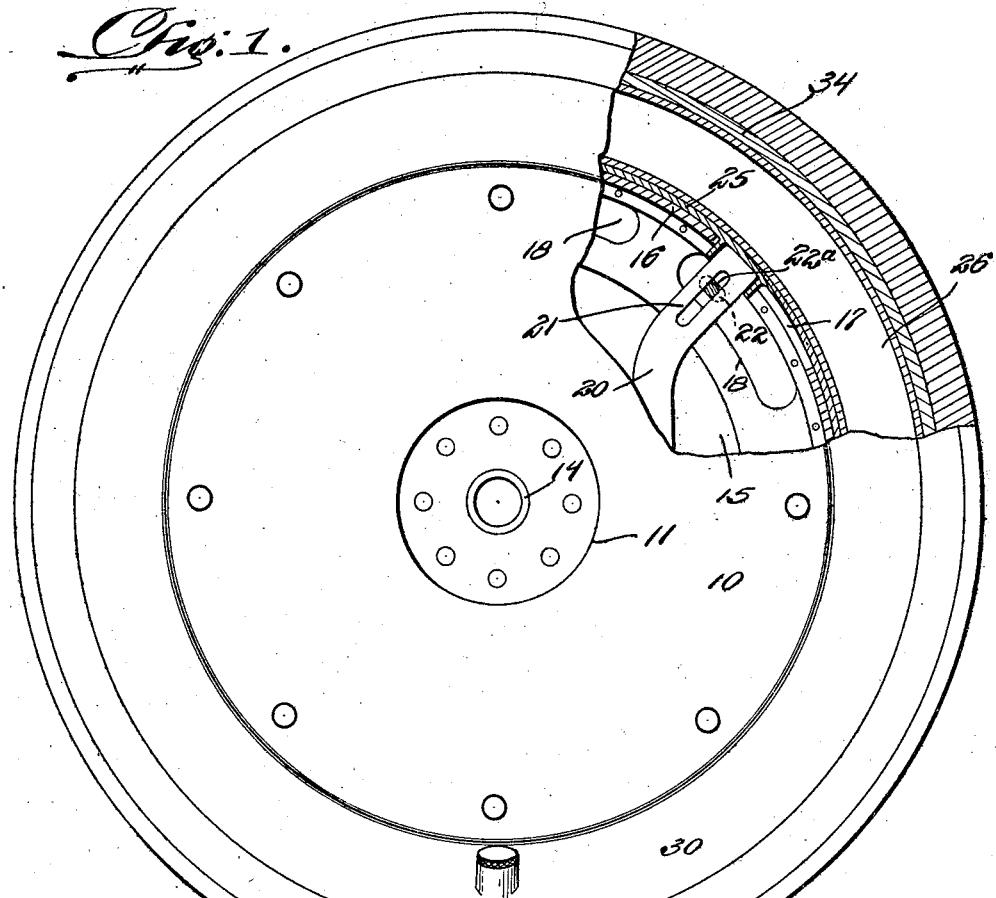
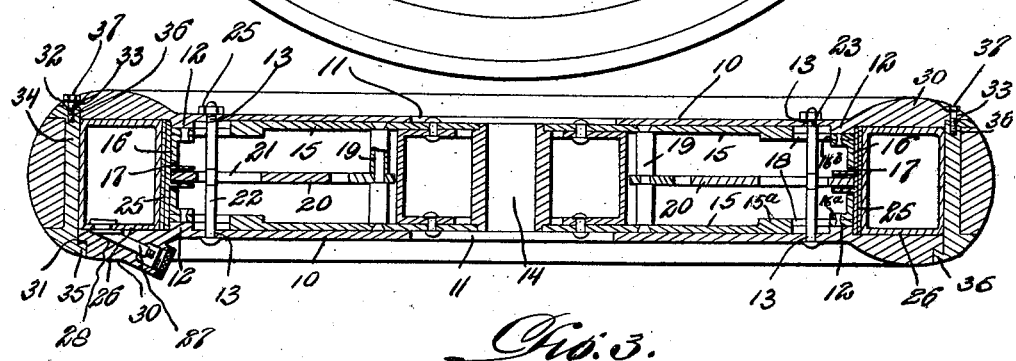
J. B. Harmon
INVENTOR Apr. 17, 1923.
J. B. HARMON
1,452,423
VEHICLE WHEEL
Filed Sept. 19, 1921
2 Sheets-Sheet 2
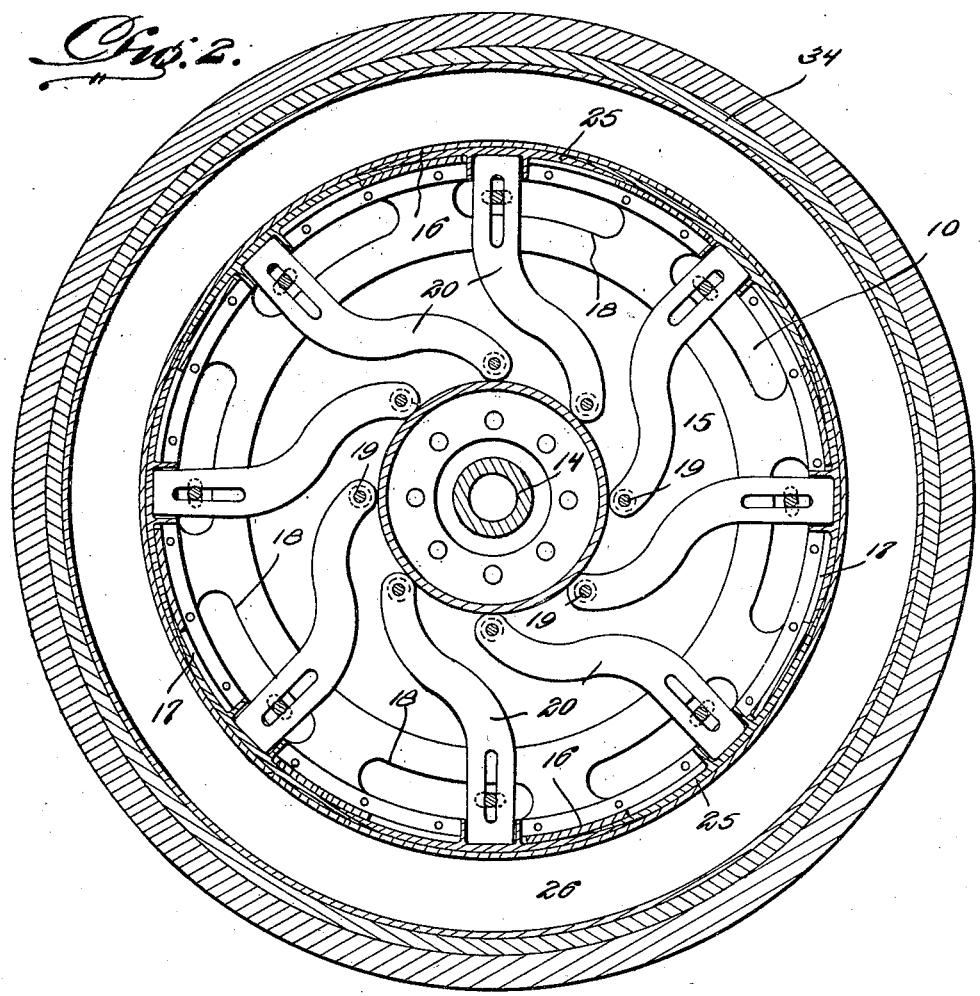
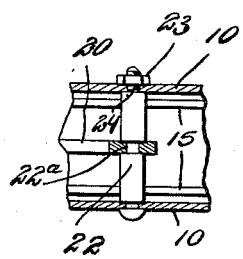

Patented Apr. 17, 1923.

1,452,423

UNITED STATES PATENT OFFICE.

JAMES B. HARMON, OF HELENA, MONTANA.

VEHICLE WHEEL.

Application filed September 19, 1921. Serial No. 501,531.

*To all whom it may concern:*

Be it known that I, JAMES B. HARMON, a citizen of the United States, residing at Helena, in the county of Lewis and Clark and State of Montana, have invented new and useful Improvements in Vehicle Wheels, of which the following is a specification.

This invention relates to vehicle wheels and has for its object the provision of a wheel of the cushion type which is designed to eliminate the use of tire casings and which is therefore free from the disadvantages of punctures, blow-outs and the like.

An important and more specific object is the provision of a wheel of this character which is constructed entirely of metal and which includes a hub portion carrying movable spokes having their outer ends engaging spring shoes bearing against an entirely enclosed inflatable tube whereby to obtain proper resilience.

Another object is the provision of a wheel of this character which is so constructed that injury to the inflatable tube will be prevented in case of deflation of the tube.

An additional object is the provision of a wheel of this character which will be simple and inexpensive in manufacture, highly efficient in use, durable in service and a general improvement in the art.

With the above and other objects and advantages in view, the invention consists in the details of construction to be hereinafter more fully described and claimed, and illustrated in the accompanying drawings in which:

Figure 1 is an elevation of my wheel with a portion of one of the side plates removed.

Figure 2 is a central sectional view taken in a plane parallel with one of the side plates, that is, in a plane transverse to the axis of the wheel.

Figure 3 is a central cross sectional view, and

Figure 4 is a detail sectional view.

Referring more particularly to the drawings I have shown my wheel as comprising a pair of side discs 10 which are provided centrally with relatively large circular openings 11 for a purpose to be described. Each side disc 10 is formed on its inner face with a circular rib 12 and is provided inwardly of the rib with a series of holes 13 arranged at equally spaced intervals.

The wheel further includes a hub portion 14 which is disposed between the discs 10 and which may be formed for use in connection with the front or rear axle of the vehicle. This hub portion has secured upon opposite sides thereof circular discs or plates 15 which are of considerably less diameter than the side discs 10 and which are connected at their outer edges by a ring 16 formed at spaced intervals with elongated slots 17. Formed on the discs 15 are thickened portions 15$^a$ formed with series of arcuate slots 18 registering with the holes 13 in the side discs 10. The entire structure formed by the hub 14, discs 15 and rings 16 is freely movable between the side discs 10 so as to prevent binding of any of the parts to be described. The ring 16 is formed with side flanges 16$^a$ secured to wear rings 16$^b$ which bear against the ribs 12.

Extending transversely between and through the discs 15 are pins 19 upon which are pivotally engaged the inner ends of a plurality of movable spokes 20 which are of compound curved form as indicated and the outer ends of these spokes are provided with slots 21 engaged upon pins 22 which are elongated in cross section as shown by dotted lines in Figures 1 and 2 and which have reduced central portions 22$^a$ which extend through the arcuate slots 18 and through the holes 13 in the side discs 10. Nuts 23, or the like, are disposed upon the projecting ends of these pins 22 whereby to hold the discs 10 and it will be seen that the end portions of the pins 22 are reduced whereby to provide shoulders 24 engaging against the inner faces of the side discs 10 whereby to hold the latter in proper spaced relation. It is to be noted that the outer ends of the spokes 20 are disposed in registration with the slots 17 in the ring 16 for a purpose to be described.

Disposed outwardly of the ring member 16 is a plurality of arcuate plates 25 which are formed of spring steel and which have their ends reduced and arranged in overlapping relation as clearly shown. It will be observed that the outer ends of the spokes 20 may pass through the slots 17 for engagement with the inner surfaces of the arcuate plates 25. Disposed outwardly of the overlapping plates 25 is an inflatable tube 26 having a suitable inflation valve stem 27 which passes through a hole 28 in one of the discs 10 whereby the tube may be inflated from the outside of the wheel.

The outer portions of the side discs 10 are formed with or have secured thereto relatively thick ring like extensions 30 one of which is formed with a dove tailed groove 31 and the other of which is formed with a shoulder 32 and provided with a plurality of holes 33. The numeral 34 designates the rim which is provided at one edge with a dove tailed flange 35 conformingly fitting within the groove 31 and which has its other edge provided with a plurality of sockets 36 adapted to register with the holes 33 for the accommodation of securing bolts 37 whereby the rim 34 may be detachable connected with the side plates or discs. This rim 34 may carry a cushion tire of any ordinary construction.

In the use of the wheel it will be seen that the weight is resiliently supported by the arcuate spring members which engage against the inner periphery of the inflatable tube and tend to compress the tube between these arcuate plates and the rim 34. The purpose of the ribs 12 is to limit the inward movement of the spring plates so as to preserve proper compression. The spokes do not provide resilience but are for the purpose of forming a connection between the part formed by the discs 15 and ring 16 and rim or tread in a way that will not destroy the resilience of the wheel. Their purpose is to prevent relative rotation of the rim and hub when power is applied.

The purpose of the shoulders 15ª is to limit outward movement of the part formed by discs 15 and ring 16 in case of deflation of the inner tube. The shoulder 15ª is a sufficient distance from the ring 16 to allow free movement under normal conditions, but in case of deflation the shoulder rides on the rib 12.

From the foregoing description and a study of the drawings it will be apparent that I have thus provided a simply constructed and yet highly efficient all metal wheel which will have all the advantages of the use of pneumatic tires but which will be free from the objection incident to the use thereof.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention, I claim:

1. A wheel of the character described comprising a pair of side plates formed centrally with openings, a hub member disposed between said side plates and having an axle receiving opening of considerably less diameter than said holes, said hub member including a pair of side discs each formed with series of slots, a ring member connected with the outer edges of said second named discs and formed with a plurality of slots, a plurality of spokes having their inner ends pivotally connected with the hub member and having their outer ends slotted, pins passing transversely through said first named slide plates and through said first named slots and through the slots in the spokes, the outer ends of the spokes being adapted to pass through the slots in said ring member, an expansible member formed of a plurality of arcuate spring plates arranged in overlapping relation and surrounding said ring member, an inflatable tube surrounding said series of overlapped spring plates, and a rim connection with the outer edges of said first named side plates.

2. A wheel of the character described comprising a pair of side plates formed centrally with openings, a hub member disposed between said side plates and having an axle receiving opening of considerably less diameter than said holes said hub member including a pair of side discs each formed with series of slots, a ring member connected with the outer edges of said second named discs and formed with a plurality of slots a plurality of spokes having their inner ends pivotally connected with the hub member and having their outer ends slotted, pins passing transversely through said first named side plates and through said first named slots and through the slots in the spokes, the outer ends of the spokes being adapted to pass through the slots in said ring member, an expansible member formed of a plurality of arcuate spring plates arranged in overlapping relation and surrounding said ring member, an inflatable tube surrounding said series of overlapped spring plates, and a rim connected with the outer edges of said first named side plates, said rim being detachably connected with said first named side plates, and ribs on the inner faces of said first named plates engageable with said spring plates to prevent excessive inward movement thereof.

In testimony whereof I affix my signature.

JAMES B. HARMON.